(12) United States Patent
Matsusue et al.

(10) Patent No.: US 11,365,266 B2
(45) Date of Patent: Jun. 21, 2022

(54) METHOD FOR PRODUCING CELLULOSE ETHER

(71) Applicant: SHIN-ETSU CHEMICAL CO., LTD., Tokyo (JP)

(72) Inventors: Shintaro Matsusue, Joetsu (JP); Akira Kitamura, Joetsu (JP); Mitsuhiro Yoshida, Joetsu (JP); Mitsuo Narita, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/919,909

(22) Filed: Mar. 13, 2018

(65) Prior Publication Data
US 2018/0282435 A1 Oct. 4, 2018

(30) Foreign Application Priority Data
Mar. 29, 2017 (JP) ............................... JP2017-65138

(51) Int. Cl.
| | | |
|---|---|---|
| *C08B 11/02* | (2006.01) | |
| *C08B 11/00* | (2006.01) | |
| *C08B 1/06* | (2006.01) | |
| *C08B 11/08* | (2006.01) | |
| *D21B 1/06* | (2006.01) | |
| *D21C 9/00* | (2006.01) | |

(52) U.S. Cl.
CPC ................ *C08B 11/02* (2013.01); *C08B 1/06* (2013.01); *C08B 11/00* (2013.01); *C08B 11/08* (2013.01); *D21B 1/061* (2013.01); *D21C 9/004* (2013.01)

(58) Field of Classification Search
CPC .. C08B 1/06; C08B 1/08; C08B 11/02; C08B 11/22
USPC ............ 536/84, 85, 86, 95, 96, 99, 124, 127
See application file for complete search history.

(56) References Cited

U.S. PATENT DOCUMENTS

| | | | | |
|---|---|---|---|---|
| 2,207,076 A | * | 7/1940 | Spurlin ................... | C08B 11/22 106/287.23 |
| 4,117,223 A | | 9/1978 | Lodige et al. | |
| 4,228,277 A | | 10/1980 | Landoll | |
| 4,549,415 A | * | 10/1985 | Justus .................. | B01D 11/023 68/158 |
| 9,481,738 B2 | * | 11/2016 | Narita ....................... | C08B 1/08 |

FOREIGN PATENT DOCUMENTS

| | | |
|---|---|---|
| JP | S53-041356 A | 4/1978 |
| JP | S55-110103 A | 8/1980 |
| JP | H05-287001 A | 11/1993 |

* cited by examiner

*Primary Examiner* — Shaojia A Jiang
*Assistant Examiner* — Everett White
(74) *Attorney, Agent, or Firm* — Oliff PLC

(57) ABSTRACT

A method for producing a cellulose ether having a high viscosity while keeping the same degree of polymerization as that in the production of a shaped pulp without changing a raw material or production facility. More specifically, provided is a method for producing a cellulose ether including steps of: cutting or pulverizing pulp to obtain sheet-like, chip-like, or powdery cellulose pulp, wherein the pulp is formed in a form of roll whose surface layer on at least one of the circumferential side and the ends is removed, or in a form of bale whose surface layer on at least one side is removed; bringing the obtained cellulose pulp into contact with an alkali metal hydroxide solution to obtain alkali cellulose; reacting the alkali cellulose with an alkylating agent to obtain a reaction product mixture; and subjecting the reaction product mixture to purification to obtain the cellulose ether.

5 Claims, 2 Drawing Sheets

METHOD FOR PRODUCING CELLULOSE ETHER

BACKGROUND OF THE INVENTION

1. Field of the Invention

The present invention relates to a method for producing a cellulose ether, more specifically a method for producing a high-viscosity cellulose ether.

2. Related Art

A cellulose ether having a thermoreversible gelation property such as methyl cellulose and hydroxypropyl methyl cellulose has been used as a binder widely in the fields of food, building materials and the like because it exhibits a thickening, water-retaining or lubricating function even when added in a relatively small amount.

An industrially available cellulose ether has a various degree of polymerization, and a type of product exhibiting an appropriate viscosity at an appropriate addition amount has been selected, depending on the using purpose. It is known that when a cellulose ether has a higher degree of polymerization, that is, it provides a higher viscosity, a solution having an intended viscosity can be obtained even if it is added in a smaller amount. There is accordingly a demand for a cellulose ether having a higher degree of polymerization at a lower cost from the standpoint of reducing its addition amount.

As a commonly known method for producing a cellulose ether, there is provided a method comprising steps of bringing cellulose pulp into contact with an alkali metal hydroxide solution to obtain alkali cellulose, reacting the alkali cellulose with an alkylating agent to obtain an etherification reaction product mixture, and then subjecting the reaction product mixture to purification.

An industrial reactor for a cellulose ether usually has a large internal capacity from the standpoint of raising throughput and thereby increasing a production efficiency. There is therefore an example of producing a cellulose ether in a reactor with an internal stirring having an internal capacity of 20 m$^3$ or 25 m$^3$ (JP 53-041356A). Cellulose pulp, which is a raw material, is usually circulated in a form of roll or bale having a weight of several tens to several hundreds of kg so that a plurality of pulp rolls or bales are inevitably used per batch in the industrial production of a cellulose ether.

As a method for producing a cellulose ether which can provide a high viscosity, it is generally known to increase the degree of polymerization of raw material pulp. Also with an increase of the viscosity, the production of cellulose ether is frequently investigated. There are disclosed a method for introducing a long-chain alkyl group into a cellulose ether (JP 55-110103A) or a method for partially crosslinking a cellulose ether by the reaction with an alkyl polyhalide (JP 05-287001A).

SUMMARY OF THE INVENTION

However, it is impossible to freely increase the viscosity by the general method of producing a cellulose ether described in JP 53-041356A even if cellulose pulp having a high degree of polymerization is used as a raw material. It is because the degree of polymerization of natural cellulose is about 5000 at most.

Moreover, the method for introducing a long-chain alkyl group or the method for partially crosslinking a cellulose ether with an alkyl group requires an inevitable increase in production cost because a reagent used therefor is expensive. The method also requires additional production facility. Further, a cellulose ether having a new substituent introduced therein may be different from the cellulose ether before introduction of the new substituent, and introduction of the new substituent or crosslinking may possibly cause a change in the physical properties other than viscosity.

There is accordingly a demand for a method of producing a cellulose ether providing a higher viscosity while maintaining the same quality of the product without changing the raw material or production facility therefor.

The present inventors have carried out an extensive investigation with a view to achieving the above-described object. As a result, it has been found that the pulp in a form of roll or bale undergoes a higher reduction in the degree of polymerization at its surface layer than at its inner center with the passage of time, and that by removing the surface layer of the shaped pulp, a cellulose ether providing a high viscosity can be produced while keeping the same degree of polymerization as that in the production of shaped pulp without changing the raw material or production facility used therefor, leading to completion of the invention.

In one aspect of the invention, there is provided a method for producing a cellulose ether comprising steps of: cutting or pulverizing pulp to obtain sheet-like, chip-like, or powdery cellulose pulp, wherein the pulp is formed in a form of roll whose surface layer on at least one of the circumferential side and the ends is removed, or in form of bale whose surface layer on at least one side is removed; bringing the obtained cellulose pulp into contact with an alkali metal hydroxide solution to obtain alkali cellulose; reacting the alkali cellulose with an alkylating agent to obtain a reaction product mixture; and subjecting the reaction product mixture to purification to obtain the cellulose ether.

According to the invention, a cellulose ether providing a high viscosity while keeping the same degree of polymerization as that in the production of a shaped pulp can be produced without changing the raw material or production facility for the cellulose ether.

DETAILED DESCRIPTION OF THE PREFERRED EMBODIMENTS

Cellulose pulp such as wood pulp or linter pulp is used typically as a raw material of a cellulose ether. The intrinsic viscosity serving as an index of the degree of polymerization of cellulose pulp may be appropriately selected depending on the intended viscosity of a cellulose ether. The intrinsic viscosity at 25° C. is preferably 1000 mL/g or more, more preferably 1400 mL/g or more. The intrinsic viscosity of cellulose pulp may be determined in accordance with Method A of HS P8215.

A shaped pulp is usually stored in a form of roll or bale. The present inventors have found that the degree of polymerization of the pulp in a form of roll or bale decreases more at the surface layer than at the inner center with the passage of time. The pulp in a form of roll is a cylindrical pulp article comprising a circumferential side surface and both end surfaces. On the other hand, the pulp in a form of bale is pulp shaped into a block and includes pulp in a form of shape having a polygonal cross-section such as a triangle or quadrangle. Although the pulp in a form of bale means a shaped pulp other than the pulp in a form of roll, it is usually in a form of hexahedron with a quadrangle bottom surface, preferably in a form of regular hexahedron or rectangular parallelepiped. The pulp in a faun of bale may be an assembly of the pulp shaped into blocks. The reason why the degree of polymerization decreases at the surface layer of the shaped pulp with the passage of time is that the surface layer is exposed directly to the outside air and depolymerization of cellulose chains is considered to proceed due to external factors such as oxygen and heat. On the other hand, it is considered that the same degree of polymerization as that in the production of the shaped pulp can be maintained at the center of the shaped pulp because the center is less directly influenced by oxygen or heat and therefore depolymerization hardly proceeds there. The surface layer on at least one of the circumferential side and the ends of the pulp in a form of roll, or the surface layer on at least one side of the pulp in a form of bale is a layer exposed to the outside air. It becomes possible to use a shaped pulp having a degree of polymerization approximately same as that in the production of the shaped pulp by removing at least one surface layer exposed to the outside air, preferably by removing all the surfaces layers exposed to the outside air.

Figure 1:
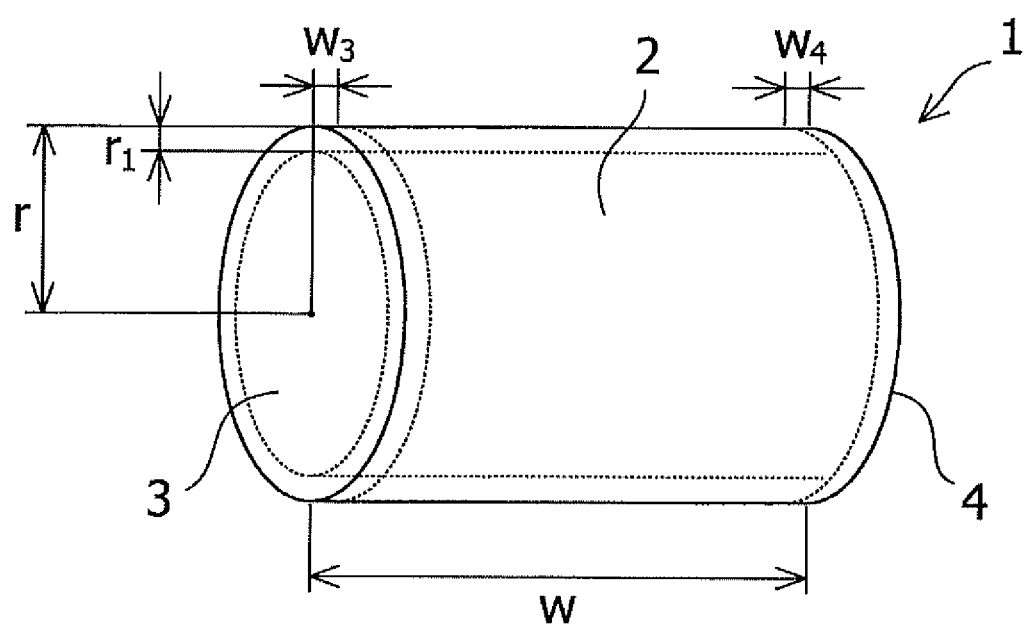
FIG. 1 shows an example of the surface layer to be removed from a roll-shaped pulp article.

Regarding the circumferential side surface of the pulp roll, the surface to be removed corresponds to a surface layer on the circumferential side from the surface to the depth of preferably from 2.5 to 25%, more preferably from 7 to 25%, still more preferably from 13 to 25% of the roll radius. FIG. 1 shows an example of the surface layer to be removed from the roll-shaped pulp article. FIG. 1 shows the surface layer of a roll-shaped pulp article 1, wherein the surface layer is a layer from the circumferential side surface to the depth $r_1$ along the radius r of the roll. When the surface layer to be removed has the depth of less than 2.5%, a reduction in viscosity may not be suppressed significantly. When it has the depth of more than 25%, production efficiency may be lowered.

Regarding one of the end surfaces of the pulp roll, the surface layer to be removed corresponds to a surface layer on one end from the end surface to the depth of from 1.25 to 12.5%, more preferably from 5 to 12.5%, still more preferably from 7 to 12.5% of the roll width. In FIG. 1, the surface layer to be removed corresponds to a surface layer from the end surface 3 to a depth $w_3$ along a roll width w which has a length between a roll end face 3 and a roll end face 4 where a circumferential surface 2 is located therebetween, or a surface layer from the end face 4 to a depth $w_4$ along the roll width w. For removal of the roll end surface layer, it is preferable from the standpoint of producing a cellulose ether providing a higher viscosity to remove the surface layer with the constant depth from each end so that the depth of the surface layer to be removed from each end falls within the above-described range.

In the pulp roll, removal of the respective surface layers on the circumferential side and on both of the ends is particularly preferable because this makes it possible to produce a cellulose ether providing a still higher viscosity.

Taking a hexahedral article with a quadrilateral bottom face (preferably a regular hexahedron or rectangular parallelepiped) as an example of the pulp bale, the surface layer to be removed is a layer from the surface to a depth of from 1.25 to 12.5%, preferably from 5 to 12.5%, more preferably from 7.5 to 12.5% of the height, length or depth of the pulp bale. For example, when the upper bottom surface layer or lower bottom surface layer is removed from the pulp bale, the height of the pulp bale is used as a standard. When the right side or left side surface layer is removed from the pulp bale, the width of the pulp bale is used as a standard. When the front side or back side surface layer is removed from the pulp bale, the depth of the pulp bale is used as a standard. The surface of the pulp bale where the surface layer is removed is not particularly limited. The number or combination of the surface or surfaces where the surface layer or layers are removed can be appropriately selected. It is effective to remove a surface having a large area affected by external factors such as oxygen and heat.

Figure 2:
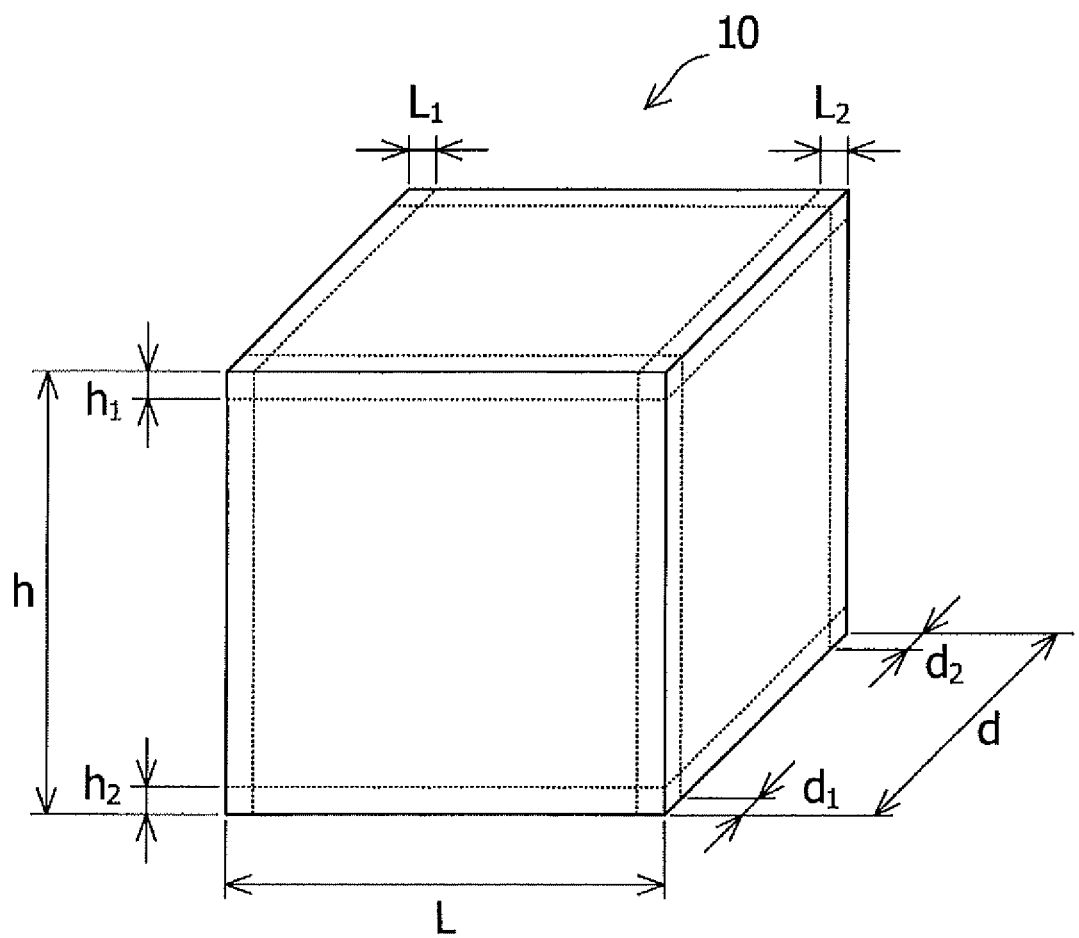
FIG. 2 shows an example of the surface layer to be removed from a bale-shaped pulp article.

FIG. 2 shows an example of the surface layer to be removed when the bale-shaped pulp article is a regular hexahedron or a rectangular parallelepiped. FIG. 2 shows a surface layer of a bale-shaped pulp article 10, wherein the surface layer is, along height h, a layer from the upper bottom surface to the depth $h_1$ in the direction to the lower bottom surface or a layer from the lower bottom surface to the depth $h_2$ in the direction to the upper bottom surface; or along width L, a layer from the left side surface to the depth $L_1$ in the direction to the right side surface or a layer from the right side surface to the depth $L_2$ in the direction to the left side surface; or along depth d, a layer from the front side surface to the depth $d_1$ in the direction to the back side surface or a layer from the back side surface to the depth $d_2$ in the direction to the front side surface.

When the pulp bale is a regular hexahedron or a rectangular parallelepiped, removal of the surface layers on the upper and lower bottoms in the height direction, the left and right sides in the length direction, and the front and back sides in the depth direction of the pulp bale is particularly preferable from the standpoint of producing a cellulose ether providing a still higher viscosity.

The diameter and width of the pulp in a form of roll are each preferably 50 cm or more. The length of each side of the pulp in a form of bale, preferably in a form of regular hexahedron or rectangular parallelepiped, is preferably 50 cm or more. Such a size is preferable because as the shaped pulp is larger, external factors such as oxygen and heat do not easily affect the inside thereof and many portions of the shaped pulp keep the same degree of polymerization as that in the production of the shaped pulp, facilitating the production of a cellulose ether providing a high viscosity.

Removal of the surface layer may be achieved by cutting the shaped pulp with a cutting device such as cutter. The type of the cutting device used therefor is not particularly limited.

Regarding the pulp in a form of roll or bale, the removing amount may be varied depending on the location of the surface layer to be removed. It is preferable to make the depth from the outermost surface constant in order to effectively maintain the same degree of polymerization as that in the production of the shaped pulp because the degree of polymerization becomes lower in a portion closer to the outermost surface. More specifically, it is preferable to remove the surface layer of the pulp roll concentrically when the surface layer on the circumferential side is removed; and it preferable to remove the surface layer in parallel to the roll end surface when the surface layer on the roll end is removed. It is preferable to remove the surface layer of the pulp bale in parallel to any one of the surfaces. It should be noted that the surface layer thus removed can be used as a raw material for producing a cellulose ether providing a lower viscosity.

After removal of the surface layer on at least one of the circumferential side and the ends of the pulp in a form of roll, or removal of the surface layer on at least one side of the pulp in a form of bale, the pulp is cut or pulverized into sheet-like, chip-like or powdery cellulose pulp.

The pulp in a form of roll or bale is cut into a sheet with a cutting device to obtain sheet-like pulp, and the sheet-like pulp is cut into chip-like pulp with a cutting device. Although the kind of the cutting device is not particularly limited, examples include a slitter cutter and a rotary die cutter.

The plane area of the chip-like pulp thus obtained is not particularly limited. The term "plane area of the chip-like pulp" means an area of the largest surface among six surfaces by regarding a piece of the chip-like pulp as a hexahedron, Powdery pulp may be obtained by pulverizing the sheet-like cellulose pulp. The powdery pulp may be produced by pulverizing the sheet-like cellulose pulp with a pulverizer such as a knife mill, a cutting mill, a hammer mill, a ball mill or a vertical roller mill. The type of the pulverizer to be used is not particularly limited. In addition, the particle size and bulk density of the powdery pulp thus obtained are not particularly limited.

The cellulose pulp obtained by removing the surface layer in such a manner may be brought into contact with an alkali metal hydroxide solution to produce alkali cellulose.

Examples of the method of bringing the cellulose pulp into contact with an alkali metal hydroxide solution include a method comprising a step of adding a necessary amount of the alkali metal hydroxide solution to the powdery pulp or chip-like pulp, and a method comprising steps of immersing the sheet-like cellulose pulp in the alkali metal hydroxide solution and removing an excess portion of the alkali metal hydroxide solution by pressing or the like. It is preferable to add the alkali metal hydroxide solution to the powdery pulp or chip-like pulp from the standpoint of easy control of the amount of the alkali metal hydroxide to be added.

Examples of the method of mixing the alkali metal hydroxide solution with the powdery pulp or chip-like pulp include a method comprising a step of adding dropwise the alkali metal hydroxide solution to the powdery pulp or chip-like pulp, and a method comprising a step of spraying the alkali metal hydroxide solution thereto. It is preferable to use the method comprising a step of spraying the solution from the standpoint of obtaining uniform alkali cellulose.

The alkali metal hydroxide to be used is not particularly limited. Sodium hydroxide, potassium hydroxide or the like may be used. The sodium hydroxide is preferable from the standpoint of the economy. The concentration of the alkali metal hydroxide in the alkali metal hydroxide solution is preferably from 10 to 60% by weight, more preferably from 30 to 50% by weight from the standpoint of handling ease and etherification reaction efficiency. Water is typically used as a solvent for dissolving the alkali metal hydroxide therein to obtain an alkali metal hydroxide solution, but a lower alcohol (preferably, an alcohol having from 1 to 4 carbon atoms) or another inert solvent, or a combination thereof may be used.

The step of bringing the cellulose pulp into contact with the alkali metal hydroxide solution is preferably carried out in a reactor with an internal stirring structure. The reactor is desirably equipped with a measurement tool capable of measuring the internal temperature of the reactor.

Prior to the contact between the alkali metal hydroxide solution and the cellulose pulp, it is desirable to remove the air from the reactor by means of a vacuum pump or the like and purge with an inert gas (preferably nitrogen) to suppress the depolymerization of a cellulose which may occur in the presence of the alkali metal hydroxide and oxygen.

The temperature when the cellulose pulp is brought into contact with the alkali metal hydroxide solution is preferably from 10 to 80° C., more preferably from 30 to 70° C. from the standpoint of obtaining uniform alkali cellulose.

The contact time required for bringing the cellulose pulp into contact with the alkali metal hydroxide solution is preferably for 5 seconds to 30 minutes, more preferably from 10 seconds to 20 minutes from the standpoint of obtaining uniform alkali cellulose.

After completion of the addition of the alkali metal hydroxide solution, stirring may be continued for from 5 to 30 minutes to make the alkali cellulose more uniform.

The alkali cellulose thus obtained may be reacted with an alkylating agent for etherification in a known manner to produce a cellulose ether. Examples of the cellulose ether include an alkyl cellulose, a hydroxyalkyl cellulose, a hydroxyalkyl alkyl cellulose, and carboxymethyl cellulose.

Examples of the alkyl cellulose include methyl cellulose having a methoxy degree of substitution (DS) of from 1.0 to 2.2, and ethyl cellulose having an ethoxy degree of substitution (DS) of from 2.0 to 2.6. The term "DS" means a degree of substitution and it is the average number of hydroxyl groups whose hydrogen atoms are substituted by alkyl groups per glucose ring unit of the cellulose.

Examples of the hydroxyalkyl cellulose include hydroxyethyl cellulose having a hydroxyethoxy molar substitution (MS) of from 0.05 to 3.0, and hydroxypropyl cellulose having a hydroxypropoxy molar substitution (MS) of from 0.05 to 3.3. The term "MS" means a molar substitution and it is the average number of moles of the hydroxyalkyl groups added per glucose ring unit of the cellulose. The MS and DS can be obtained by conversion based on the results of the measurement method described in "Hypromellose" in the Japanese Pharmacopoeia Seventeenth Edition.

Examples of the hydroxyalkyl alkyl cellulose include hydroxyethyl methyl cellulose having a methoxy degree of substitution (DS) of from 1.0 to 2.2 and a hydroxyethoxy molar substitution (MS) of from 0.1 to 0.6; hydroxypropyl methyl cellulose having a methoxy degree of substitution (DS) of from 1.0 to 2.2 and a hydroxypropoxy molar substitution (MS) of from 0.1 to 0.6; and hydroxypropyl ethyl cellulose having an ethoxy degree of substitution (DS) of from 1.0 to 2.2 and a hydroxypropoxy molar substitution (MS) of from 0.1 to 0.6.

Additional examples of the cellulose ether include carboxymethyl cellulose having a carboxymethoxy degree of substitution (DS) of from 0.2 to 2.0.

Examples of the alkylating agent include an alkyl halide such as methyl chloride and ethyl iodide, an alkylene oxide such as ethylene oxide and propylene oxide, and monochloroacetic acid.

The internal temperature of the reactor during the reaction with the alkylating agent is preferably from 40 to 90° C., more preferably from 50 to 80° C. from the standpoint of reaction control.

The mixing method of the alkylating agent is preferably a method of adding the alkylating agent to the alkali cellulose, and the alkylating agent is added for preferably from 5 to 120 minutes, more preferably from 10 to 90 minutes from the standpoint of reaction controllability and productivity.

The reaction product mixture obtained by the reaction between the alkali cellulose and the alkylating agent is desirably mixed with stirring even after the addition of the alkylating agent is completed so as to complete the etherification reaction. The stirring time after the addition of the alkylating agent is preferably from 20 to 120 minutes, more preferably from 30 to 100 minutes from the standpoint of productivity.

The internal temperature of the reactor during stirring after the addition of the alkylating agent is preferably from 80 to 120° C., more preferably from 85 to 100° C. from the standpoint of reaction controllability.

The reaction product mixture thus obtained may be subjected to purification to obtain a cellulose ether by the same method as the conventional method of purifying a crude cellulose ether. Purification comprises steps of, for example, transferring the reaction product mixture into a container containing hot water of preferably 90° C. or more, more preferably from 90 to 98° C., suspending the reaction product mixture to dissolve a byproduct salt in the hot water, and then subjecting the resulting suspension to a separation operation. Examples of the separation operation include an operation of a pressure rotary filter, an operation of a filter press, and an operation of a suction filtering machine.

The cellulose thus obtained may dried, and then optionally pulverized with a conventional pulverizer such as a ball mill, a roller mill, or an impact grinder. Then, the pulverized product may be classified through a sieve to have a desired particle size.

The viscosity of the cellulose ether may be measured by the analysis method for hypromellose described in the Japanese Pharmacopoeia Seventeenth Edition.

EXAMPLES

The invention will hereinafter be described in detail by Examples and Comparative Examples. It should not be construed that the invention is limited to or by Examples.

Example 1

From a roll-shaped pulp article having a radius of 55 cm and a width of 75 cm, a surface layer on the circumferential side from the surface to the depth of 1.38 cm (2.5% of the roll radius) was removed. The remaining portion of the roll-shaped pulp article was pulverized by using a mesh mill while controlling the exhaust gas temperature not to exceed 80° C. The powdery cellulose pulp thus obtained was placed in a jacketed pressure reactor with internal stirring. After vacuuming and nitrogen purging in the pressure reactor, 1.40 parts by weight, based on the weight of an anhydrous portion of the cellulose pulp, of a 48% by weight aqueous sodium hydroxide solution was sprayed to the cellulose pulp with stirring over 20 minutes to produce alkali cellulose. To the resulting alkali cellulose, 0.35 parts by weight of dimethyl ether, based on the weight of the anhydrous portion of the cellulose pulp, was added and then an internal temperature was increased to 60° C. After 1.20 parts by weight of methyl chloride and 0.235 parts by weight of propylene oxide, each based on the weight of the anhydrous portion of the cellulose pulp, were added, an internal temperature was increased to 90° C. over 80 minutes. The reaction was allowed to proceed at an internal temperature of 90° C. for further 30 minutes to obtain crude hydroxypropyl methyl cellulose (which may hereinafter be abbreviated as "HPMC"). Hot water of 98° C. was added to the crude HPMC to prepare a slurry solution. A separation operation was carried out to remove a salt and an organic byproduct. Then, the remaining product was dried by an air supply dryer of 80° C. and the dried HPMC was pulverized by an impact grinder to produce HPMC. A 1% by weight aqueous solution of the resulting HPMC was prepared and its viscosity was measured at 20° C. and 12 rpm by a Brookfield rotary viscometer to be 24200 mPa·s. The results are shown in Table 1.

Example 2

HPMC was produced in the same manner as in Example 1 except that a surface layer on the circumferential side from the surface to the depth of 8.25 cm (15% of the roll radius) was removed. The viscosity of a 1% by weight aqueous solution of the resulting HPMC was measured to be 24900 mPa·s. The results are shown in Table 1.

Example 3

HPMC was produced in the same manner as in Example 1 except that a surface layer on the circumferential side from the surface to the depth of 13.8 cm (25% of the roll radius) was removed. The viscosity of a 1% by weight aqueous solution of the resulting HPMC was measured to be 25300 mPa·s. The results are shown in Table 1.

Example 4

HPMC was produced in the same manner as in Example 1 except that removal of the surface layer on the circumferential side was replaced by removal of the surface layer on each end from the surface to the depth of 9.4 cm (12.5% of the roll width). The viscosity of a 1% by weight aqueous solution of the resulting HPMC was measured to be 24600 mPa·s. The results are shown in Table 1.

Example 5

From a bale-shaped pulp article having a size of 70 cm depth×80 cm width×70 cm height, a surface layer on the upper bottom side from the surface to the depth of 8.75 cm (12.5% of bale height) and a surface layer on the lower bottom side from the surface to the depth of 8.75 cm (12.5% of the bale height) were removed. The remaining portion of the bale-shaped pulp article was pulverized using a mesh mill while controlling the exhaust gas temperature not to exceed 80° C. The powdery cellulose pulp thus obtained was placed in a jacketed pressure reactor with internal stirring. After vacuuming and nitrogen purging in the pressure reactor, 1.35 parts by weight, based on the weight of an anhydrous portion of the cellulose pulp, of a 48% by weight aqueous sodium hydroxide solution was sprayed to the cellulose pulp with stirring over 15 minutes to produce alkali cellulose. To the resulting alkali cellulose, 0.5 parts by weight of dimethyl ether, based on the weight of the anhydrous portion of the cellulose pulp, was added and then the internal temperature was increased to 60° C. After 1.08 parts by weight of methyl chloride and 0.187 part by weight of ethylene oxide, each based on the weight of the anhydrous portion of the cellulose pulp, were added, the internal temperature was increased to 90° C. over 90 minutes. The reaction was allowed to proceed at the internal temperature of 90° C. for further 30 minutes to obtain crude hydroxyethyl methyl cellulose (which may hereinafter be abbreviated "HEMC"). Hot water of 98° C. was added to the crude HEMC to prepare a slurry solution. A separation operation was performed to remove the salt and organic byproduct. Then, the remaining product was dried using an air supply dryer of 80° C. and the dried HEMC was pulverized by an impact grinder to produce HEMC. A 1% by weight aqueous solution of the resulting HEMC was prepared and its viscosity at 20° C. was measured with a Brookfield rotary viscometer to be 23500 mPa·s. The results are shown in Table 1.

Example 6

HEMC was produced in the same manner as in Example 5 except that a surface layer on the upper bottom side of the bale pulp from the surface to the depth of 8.75 cm (12.5% of the bale height), a surface layer on the lower bottom side from the surface to the depth of 8.75 cm (12.5% of the bale height), a surface layer on the left side from the surface to the depth of 10 cm (12.5% of the bale length), a surface layer on the right side from the surface to the depth of 10 cm (12.5% of the bale length), a surface layer on the front side from the surface to the depth of 8.75 cm (12.5% of the bale depth), and a surface layer on the back side from the surface to the depth of 8.75 cm (12.5% of the bale depth) were all removed. The viscosity at 20° C. of a 1% by weight aqueous solution of the resulting HEMC was measured to be 24700 mPa·s. The results are shown in Table 1.

Comparative Example 1

HPMC was produced in the same manner as in Example 1 except that the roll-shaped pulp article was used as it was as a raw material without removing the surface layer thereof. The viscosity at 20° C. of a 1% by weight aqueous solution of the resulting HPMC was measured to be 23600 mPa·s. The results are shown in Table 1.

Comparative Example 2

HEMC was produced in the same manner as in Example 5 except that the bale-shaped pulp article was used as it was as a raw material without removing the surface layer thereof. The viscosity at 20° C. of a 1% by weight aqueous solution of the resulting HEMC was measured to be 22200 mPa·s. The results are shown in Table 1.

TABLE 1

|  | shape of pulp article | surface layer to be removed | viscosity at 20° C. of aq. 1 wt % solution (mPa · s) |
|---|---|---|---|
| Example 1 | roll | from the circumferential side surface to the depth of 2.5% of the roll radius | 24200 |
| Example 2 | roll | from the circumferential side surface to the depth of 15% of the roll radius | 24900 |
| Example 3 | roll | from the circumferential side surface to the depth of 25% of the roll radius | 25300 |
| Example 4 | roll | from each end surface to the depth of 12.5% of the roll width | 24600 |
| Example 5 | bale | from each of upper and lower bottom surfaces to the depth of 12.5% of the bale height | 23500 |
| Example 6 | bale | from each of upper and lower bottom surfaces to the depth of 12.5% of the bale height, from each of left and right surfaces to the depth of 12.5% of the bale width and from each of front and back surfaces to the depth of 12.5% of the bale depth | 24700 |
| Comp. Ex. 1 | roll | none | 23600 |
| Comp. Ex. 2 | bale | none | 22200 |

The invention claimed is:

1. A method for producing a cellulose ether, comprising:
removing a surface layer on at least one of the circumferential side and the ends of pulp in a form of a roll, or removing a surface layer on at least one side of pulp in a form of a bale, to obtain surface-removed pulp, wherein the removed surface layer was a part of the pulp,
cutting or pulverizing the surface-removed pulp free of the removed surface layer(s) to obtain cellulose pulp in a form of a sheet, a chip or a powder,
bringing the obtained cellulose pulp into contact with an alkali metal hydroxide solution to obtain alkali cellulose,
reacting the alkali cellulose with an alkylating agent to obtain a reaction product mixture, and
subjecting the reaction product mixture to purification to obtain the cellulose ether.

2. The method for producing a cellulose ether according to claim 1, wherein the pulp is in the form of the roll, and wherein the surface layer on the circumferential side is removed in a depth of 2.5 to 25% of a roll radius from the surface, or the surface layer on at least one of the ends is removed in a depth of 1.25 to 12.5% of a roll width.

3. The method for producing a cellulose ether according to claim 1, wherein the pulp is in the form of the bale, and wherein the bale is a hexahedron with quadrangle upper and lower bottom surfaces, and the surface layer of the bale is removed in a depth of 1.25 to 12.5% of a height, a length, or a depth of the bale.

4. The method for producing a cellulose ether according to claim 1, wherein the pulp is in the form of the roll, and wherein the roll has a diameter of 50 cm or more and a width of 50 cm or more before the surface layer being removed.

5. The method for producing a cellulose ether according to claim 1, wherein the pulp is in the form of the bale, and wherein the bale is a regular hexahedron or rectangular parallelepiped with each side being 50 cm long or longer.

* * * * *